United States Patent [19]
Dion

[11] Patent Number: 5,305,170
[45] Date of Patent: Apr. 19, 1994

[54] LOCKING ASSEMBLY FOR THE ACTUATOR ARM OF A HARD DISK DRIVE

[75] Inventor: F. Eugene Dion, Longmont, Colo.
[73] Assignee: Maxtor Corporation, San Jose, Calif.
[21] Appl. No.: 975,656
[22] Filed: Nov. 13, 1992
[51] Int. Cl.⁵ .............................................. G11B 21/22
[52] U.S. Cl. .................................................. 360/105
[58] Field of Search ................................ 360/105, 106

[56] References Cited

U.S. PATENT DOCUMENTS 4,996,617  2/1991  Yaeger et al. ...................... 360/105
5,019,932  5/1991  Iwata .................................. 360/105

Primary Examiner—Robert S. Tupper
Attorney, Agent, or Firm—Blakely, Sokoloff, Taylor & Zafman

[57] ABSTRACT

A detent mechanism for securing the magnetic head of hard disk drive above a landing zone of a magnetic disk, when power to the disk drive is terminated. The detent mechanism includes a first detent which is attached to the actuator arm and a second detent that is mounted to the housing of the disk drive unit. The detents have a pair of teeth that become locked when the actuator arm rotates above the landing zone of the disk. The detents are constructed to be flexible enough, so that the teeth may be separated when power is supplied to the drive unit and the actuator arm is rotated away from the landing zone.

1 Claim, 4 Drawing Sheets

LOCKING ASSEMBLY FOR THE ACTUATOR ARM OF A HARD DISK DRIVE

BACKGROUND OF THE INVENTION

1. Field of the Invention

The present invention relates to a mechanism which locks the actuator arm of a hard disk drive assembly.

2. Description of Related Art

Hard disk drives typically have an actuator arm which can move relative to a magnetic disk that is rotated by an electric motor. At the end of the actuator arm is a magnetic head which can magnetize or sense the magnetic field of the disk. The magnetic head is typically separated from the surface of the disk by an air gap that is on the order of 0.06 microns in length. Any contact between the head and the magnetic disk may result in a loss of data or possible damage to the disk.

Hard disk drive units that are used in portable computers are more likely to be subjected to external shock or vibrational loads. For example, the user may drop the computer, or the computer may be transported within a vehicle that applies a vibrational load to the disk drive unit. The application of an external force to the drive unit may cause the magnetic head to strike or otherwise come into contact with the disk when the disk is not spinning. It is therefore desirable to have a hard disk drive which reduces the likelihood of damage to the magnetic disk when the drive unit is subjected to an external load.

Some magnetic disk contain a landing zone where the magnetic head is positioned when no power is supplied to the drive unit and the disk is not spinning. The landing zone is a blank area of the disk where data is not normally stored. Thus any shock or vibrationally induced contact between the head and magnetic disk surface will not damage the disk.

When the disk is spinning, the actuator arm and head are located adjacent to a read/write zone of the magnetic disk. When power to the drive unit is terminated, such as when the computer is turned off, the control logic of the hard disk drive rotates the magnetic head above the landing zone. The motor is sometimes used as a generator that supplies power to the actuator arm during the power down cycle of the drive unit.

As the motor reduces speed, less power is supplied to the coils of the actuator arm. Consequently, the magnetic head can skew off of the landing zone of the disk. Additionally, the actuator arm may rotate away from the landing zone if the disk drive is subjected to an external load. It would therefore be desirable to have a hard disk drive which locks the magnetic head above the landing zone when power to the drive unit is terminated.

SUMMARY OF THE INVENTION

The present invention is a detent mechanism for securing the magnetic head of hard disk drive above a landing zone of a magnetic disk, when power to the disk drive is terminated. The detent mechanism includes a first detent which is attached to the actuator arm and a second detent that is mounted to the housing of the disk drive unit. The detent have a pair of teeth that become locked when the actuator arm rotates above the landing zone of the disk. The detents are constructed to be flexible enough, so that the teeth may be separated when power is supplied to the drive unit and the actuator arm is rotated away from the landing zone.

The detent mechanism is preferable used in a portable hard disk drive card unit which can be plugged into a computer. When power to the hard drive is terminated, either by unplugging the card or turning off the computer, the control logic of the drive unit rotates the actuator arm above the landing zone until the detents engage and secure the arm to the housing. When power is supplied to the disk drive, the coil of the actuator arm is energized. Energizing the coil creates a torque on the actuator arm and disengages the detents. The arm is then free to be rotated into the read/write zone of the disk.

Therefore it is an object of the present invention to provide a hard disk drive that secures the actuator arm above a landing zone of the magnetic disk when power to the disk drive is terminated.

It is also an object of the present invention to provide an actuator arm locking mechanism which can be used in a portable disk drive.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
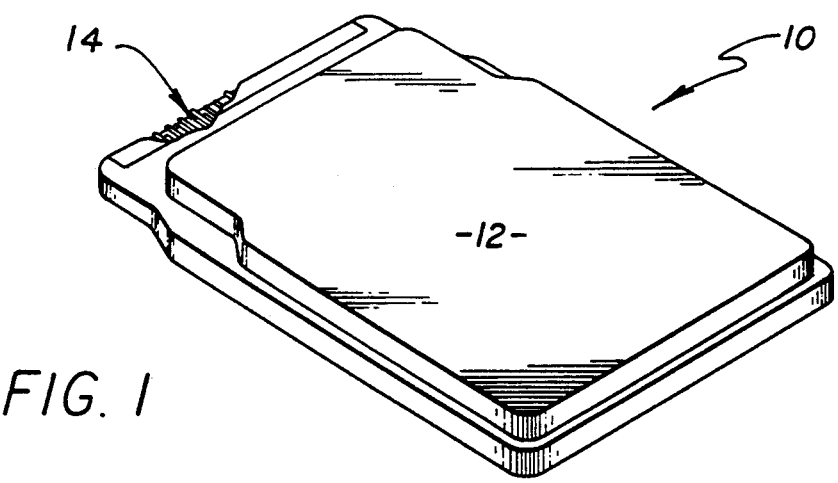
FIG. 1 is a perspective of a hard disk drive of the present invention.

Referring to the drawings more particularly by reference numbers, FIG. 1 shows a hard disk drive card unit 10 of the present invention. The hard disk unit 10 typically has a pocket size outer housing 12 with an electrical female connector 14 located at one end of the card 10. The hard disk drive card unit 10 can be plugged into a slot within a computer chassis and mated with a corresponding male connector, to couple the hard disk with the computer.

Figure 2:
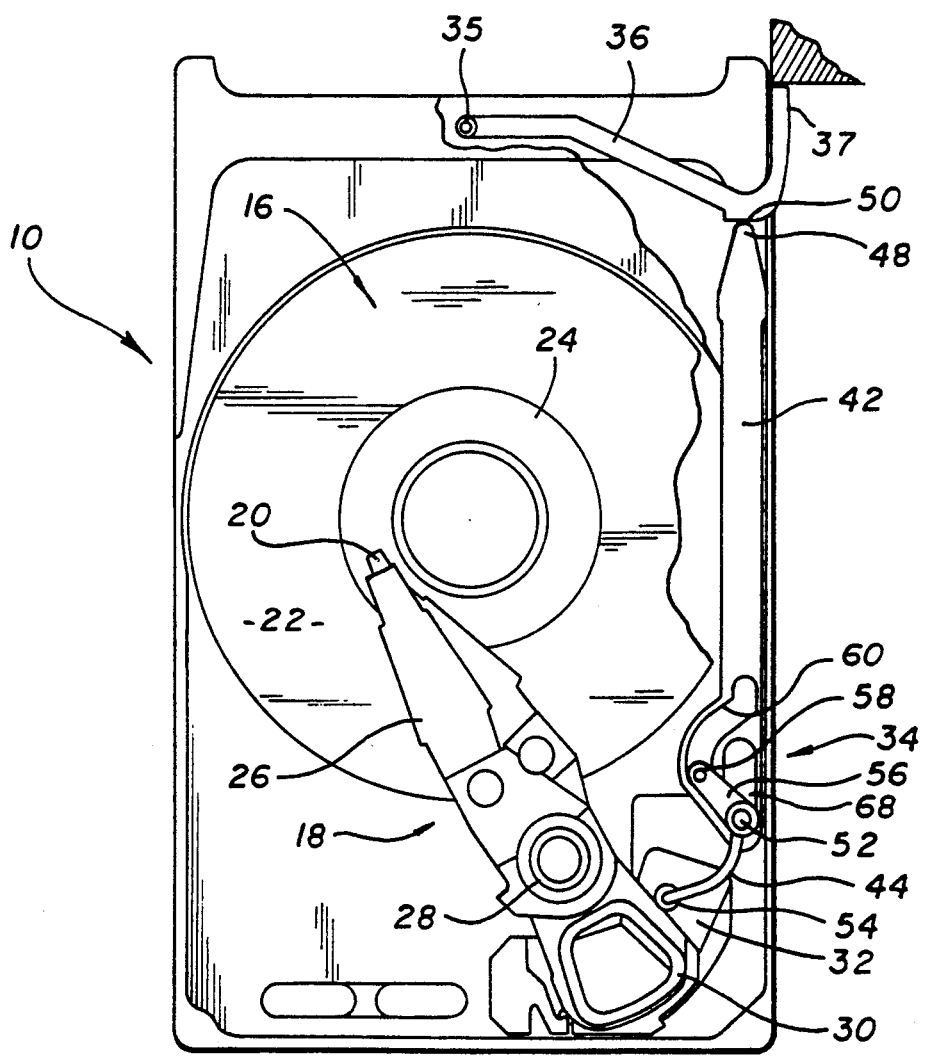
FIG. 2 is a cross-sectional top view of the hard disk of FIG. 1.
Figure 3:
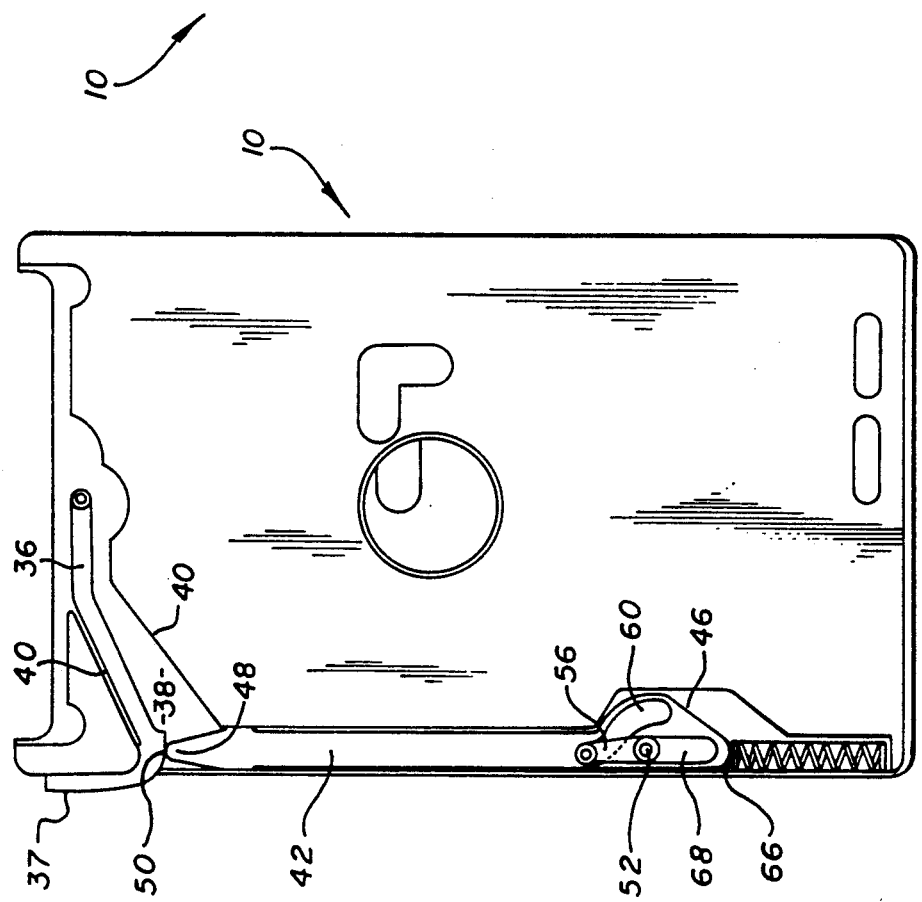
FIG. 3 is a cross-sectional bottom view of the hard disk of FIG. 1.

FIGS. 2 and 3 show the inner components of the card unit 10. The card unit 10 has one or more magnetic disk 16 which are typically coupled to an electric motor (not shown) which rotates the disk 16 relative to an actuator arm assembly 18. The actuator arm assembly 18 contains magnetic heads 20 which can magnetize and sense the magnetic field of the disk 16. The magnetic disks 16 store digital information in a read/write zone 22 of the disk 16. Most magnetic disk are constructed to also have a landing zone 24 located adjacent to the center of the disk 16. The landing zone 24 is typically not magnetized and provides an area of the disk 16 where the actuator arm assembly 18 is positioned when the disk 16 is not spinning. Placing the magnetic heads 20 within the landing zone 24, prevents data from being lost if the heads 20 damage the stationary disk 16, which may occur if the unit 10 is subjected to an external shock or vibrational load.

The actuator arm assembly 18 includes an actuator arm 26 which is pivotally connected to the housing by a bearing assembly 28. At the end of the arm 26 is a coil 30 that is adjacent to a magnetic plate 32. The coil 30 is connected to a control circuit (not shown) which can energize the coil 30 to induce movement between the actuator arm 26 and magnet 32. Movement of the actuator arm 26 moves the magnetic heads 20 relative to the surface of the disk 16. The control circuit can move the actuator arm 26 within and between the read/write zone 22 and landing zone 24 of the disk 16.

The card unit 10 has a latch assembly 34 that can move the actuator arm 26 from the read/write zone 22 to the landing zone 24, when the card 10 is detached from the computer. The latch assembly 34 includes a first latch 36 which is pivotally connected to the housing 12 by pin 35. The first latch 36 has a pawl 37 and is adapted to move between a locked position and an unlocked position. As shown in FIG. 3, the first latch 36 rotates through a first channel 38 within the housing 12. The housing 12 has a pair of stop surfaces 40 which limit the travel of the first latch 36.

The latch assembly 34 further includes a push rod 42 that couples the first latch 36 to a second latch 44. The push rod 42 can move along a second channel 46 within the housing 12. The push rod 42 has a sliding contact surface 48 which engages the first latch 36 and moves the latch 36 from the unlocked position to the locked position. The latch 36 preferably has a landing portion 50 which provides a flat surface for the roller 48. The pin 52 rotates relative to the housing 12 and typically has a seal (not shown) which prevents contaminants from entering the drive unit.

The second latch 44 is pivotally connected to the housing 12 by pin 52. The second latch 44 has a roller 54 which can engage the actuator arm 26 and move the magnetic heads 20 from the read/write zone 22 to the landing zone 24 of the disk 16. The second latch 44 is also coupled to a bell crank 56 which is pivotally connected to the housing 12 by pin 52. The bell crank 56 has a cam follower 58 which moves within a cam slot 60 in the push rod 42. The bell crank 56 is preferably coupled to the second latch 44 by an elliptical stud (not shown) that extends into an elliptical slot (not shown) in the crank 56, such that the second latch 44 rotates in conjunction with the movement of the bell crank 56.

The cam follower 58 is adapted to follow the cam slot 60 and rotate the bell crank 56 and second latch 44 when the push rod 42 moves within the second channel 46. Located between the end of the push rod 42 and the end of the second channel 46 is a compression spring 66 which biases the rod 42 and first latch 36 into the locked position. The push rod 42 has a clearance slot 68 which allows the rod 42 to the move relative to the pin 52.

Figure 4:
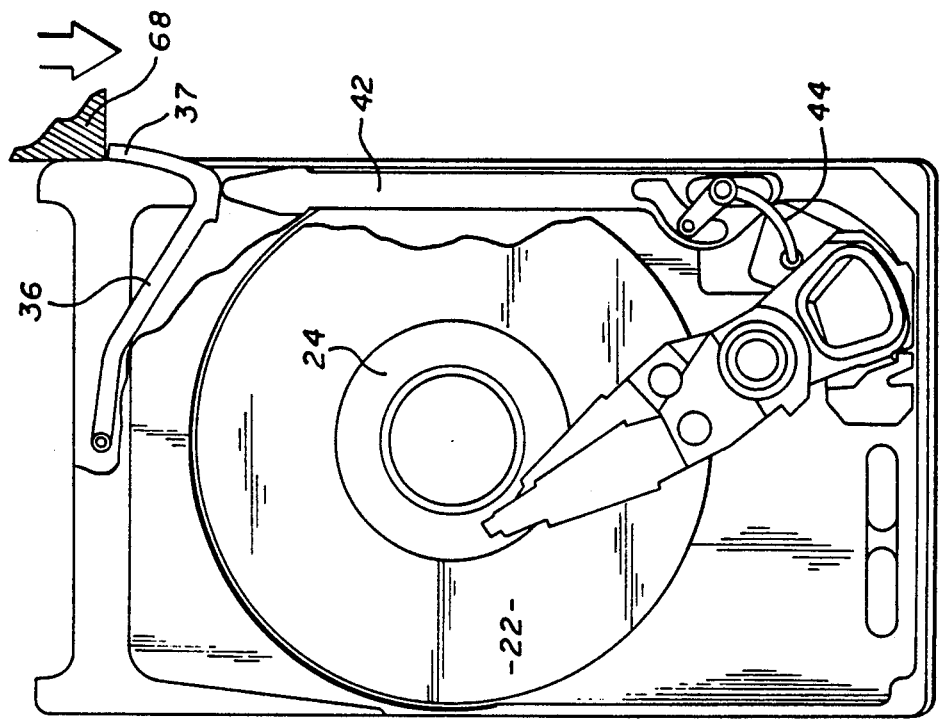
FIG. 4 is a view similar to FIG. 2 showing the disk drive being inserted into a computer.
Figure 5:
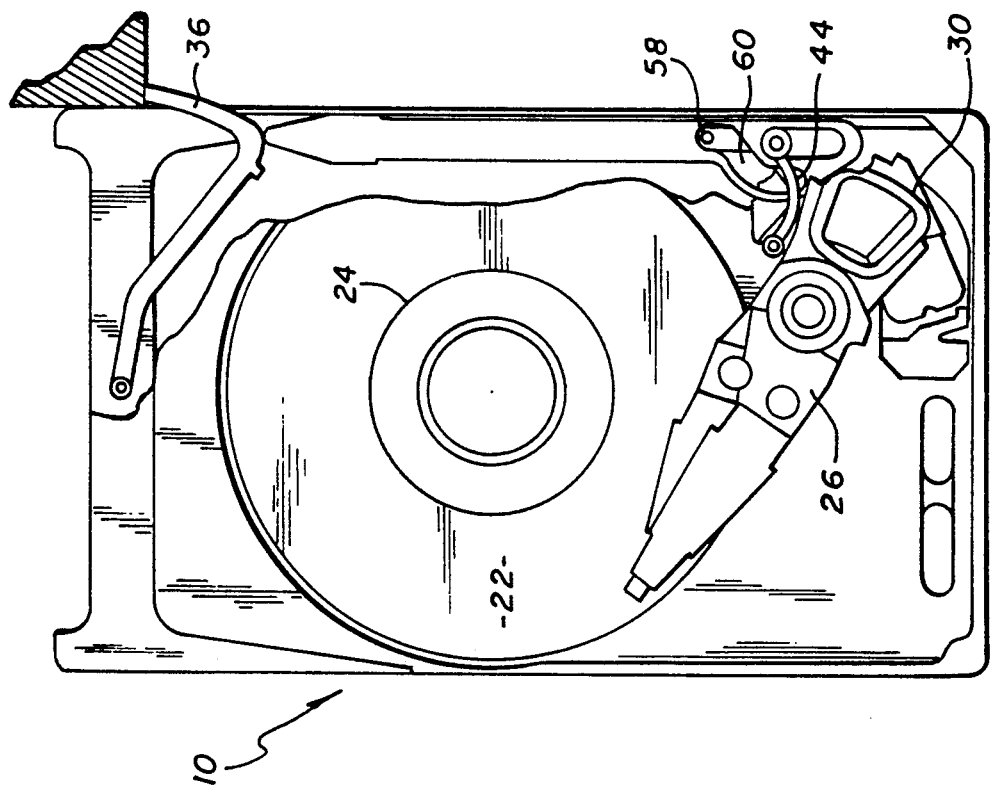
FIG. 5 is a view similar to FIG. 4 showing the disk drive completely inserted into the computer.

As shown in FIG. 4, when the card unit 10 is plugged into a computer, the pawl 37 engages a stationary member 68 within the computer. In the preferred embodiment, the stationary member 68 is a keying feature of the mating computer connector. Pushing the card 10 closer to the mating connector moves the first latch 36 into the unlocked position. As shown in FIG. 5, movement of the first latch pushes the rod 42, which causes the cam roller 50 to move within the cam slot 60. As the cam roller 58 follows the cam slot 60, the bell crank 56 rotates the second latch 44 away from the actuator arm 26. The actuator arm 26 may then rotate into the read/write zone 22 of the disk 16 by the coil 30.

When the card unit 10 is pulled out of the computer, the first latch 36 is released from the stationary member 68. Releasing the first latch 36 causes the compression spring 66 to move the push rod 42 and latch 36 back into the locked positions. Movement of the push rod 42 induces a rotation of the bell crank 56 and second latch 44, so that the latch 44 engages the actuator arm 26 and moves the magnetic heads 20 from the read/write zone 22 to the landing zone 24 of the disk 16. The force of the compression spring 66 prevents the latch 44 from moving, so that the actuator arm 22 and heads 20 do not move into the read/write zone 22 of the drive 16, if the unit 10 is subjected to an external shock or vibrational load.

Figure 6:
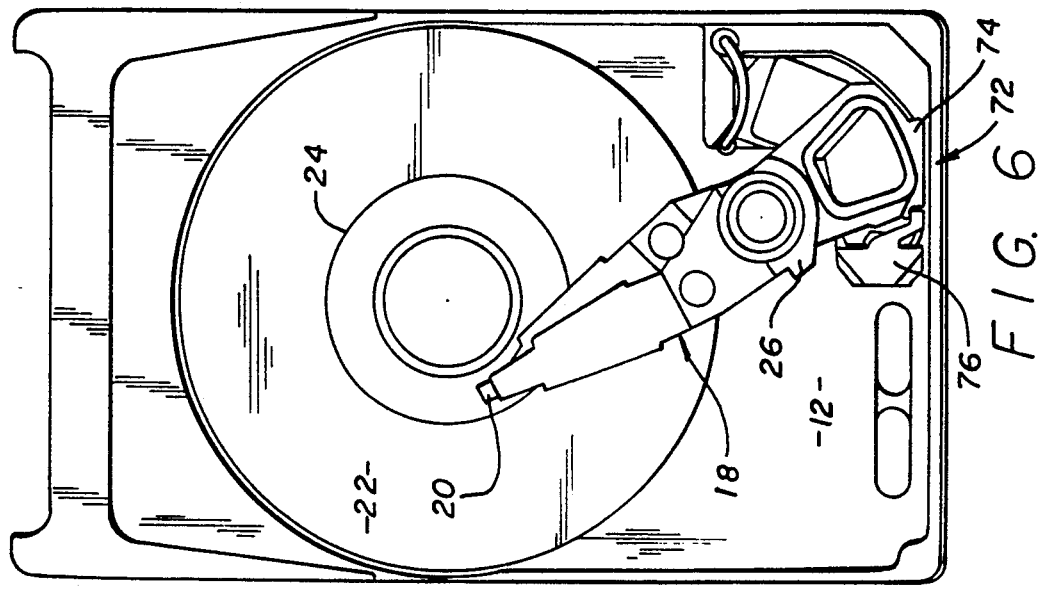
FIG. 6 is cross-sectional view showing a detent assembly that locks the actuator arm of the disk drive.

As shown in FIG. 6, the card unit 10 has a detent assembly 70. The detent assembly 72 includes a first detent 74 that is attached to the actuator arm 26 and a second detent 76 which is mounted to the housing 12. If power to the card unit 10 is terminated while the card is plugged into the computer, the disk 16 will spin down and the control circuit will cause the actuator arm 26 to move the magnetic heads 20 into the landing zone 24 of the disk 16. When the actuator arm 26 moves the heads 20 into the landing zone 24, the detents 74 and 76 become attached and prevent further movement of the actuator arm assembly 18. The detent assembly 70 prevents damage to the disk 16 when the card unit 10 is plugged into a portable computer, which may be exposed to external shock loads when the latch assembly is not constraining the actuator arm 26 to the landing zone 24. The detent assembly 72 secures the actuator arm 26 when the card is detached from the computer, and when the card is plugged into the computer and power to the drive unit 10 is terminated.

Figure 7:
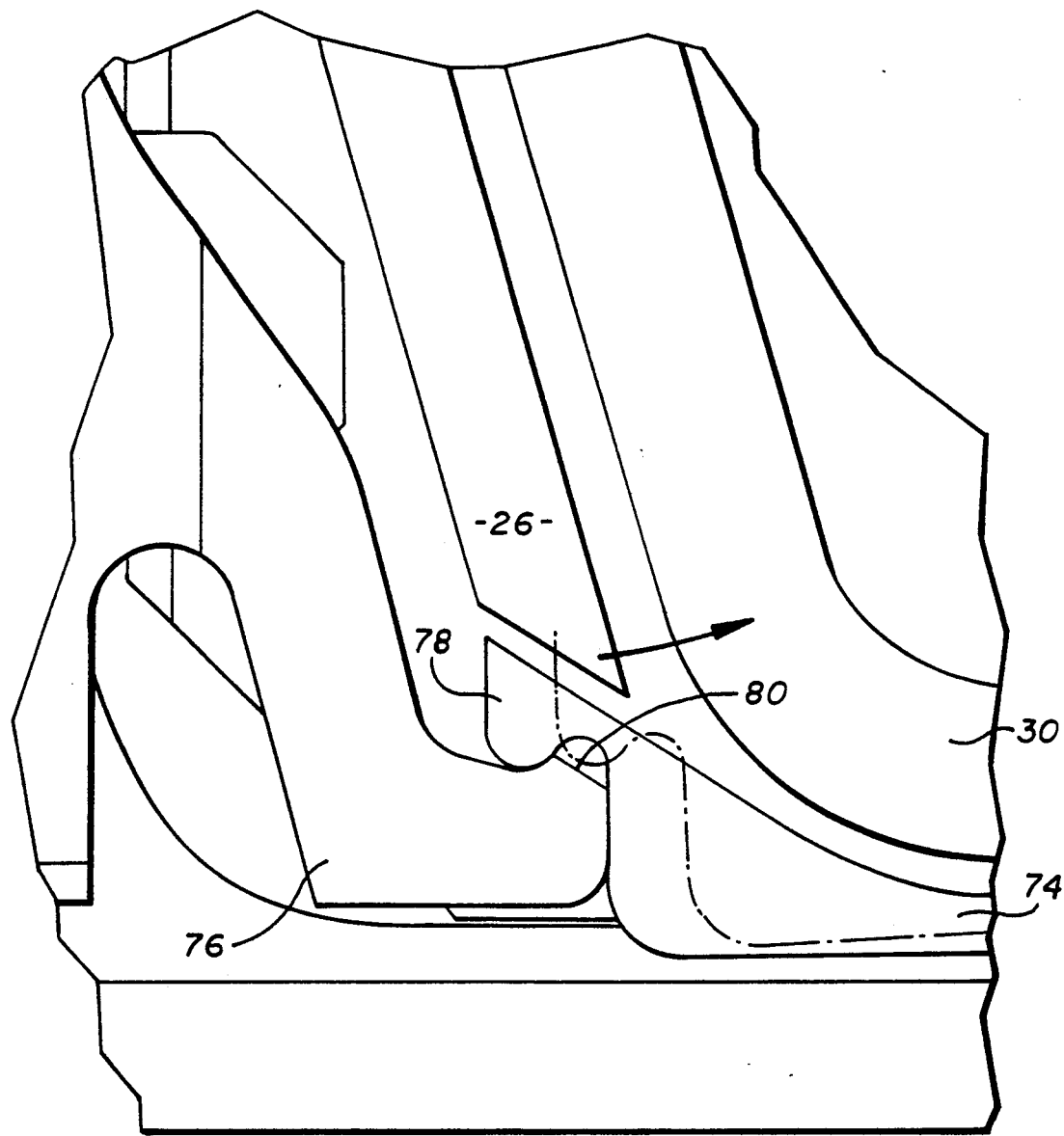
FIG. 7 is an enlarged view of the detent assembly of FIG. 6.

As shown in FIG. 7, the first detent latch 74 has a first tooth 78 which becomes locked with a second tooth 80 of the second detent latch 76 when the actuator arm 26 is rotated into the landing zone 24 of the disk 16. The detent latches are typically constructed from a plastic material which is flexible enough to bend so that the teeth become engaged when the actuator arm 26 is rotated into the landing zone 24. When power is supplied to the card unit, the control circuit energizes the coil 30, which pulls the actuator arm 26 away from the second detent latch 76. The detent latches 74 and 76 are flexible enough so that the latches become detached when the coil 30 is energized.

The present invention thus provides a pair of latching assemblies which lock the actuator arm of a portable hard disk drive that is not receiving power, either when the card is detached, or plugged into the computer.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive assembly, comprising:
   a housing;
   a magnetic disk operatively connected to said housing, said magnetic disk having a data and a landing zone;

an actuator arm assembly pivotally connected to said housing, said actuator arm assembly having a first detent with a first cantilevered tooth; and, a voice coil motor which provides a torque that moves said actuator arm assembly from said data zone to said landing zone when power to the assembly is terminated and which moves said actuator arm assembly from said landing zone to said data zone when power is supplied to the assembly;

a second detent mounted to said housing and having a second cantilevered tooth that interlocks with said first tooth and secures said actuator arm assembly in said landing zone when said voice coil motor moves said actuator arm assembly from said data zone to said landing zone, said first and second detents having a stiffness that allows said first and second teeth to be deflected and detached by said torque of said voice coil motor when said voice coil motor moves said actuator arm assembly from said landing zone to said data zone.

* * * * *